F. J. MOLONEY.
SCREW THREADED BULB MOLD.
APPLICATION FILED NOV. 26, 1915.
1,222,784.
Patented Apr. 17, 1917.
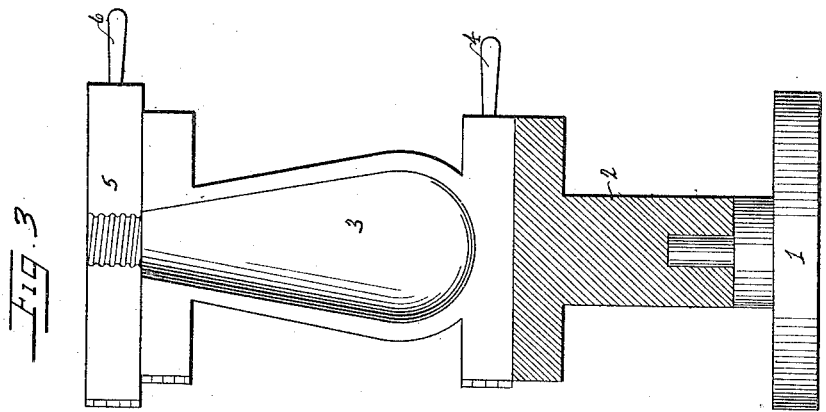
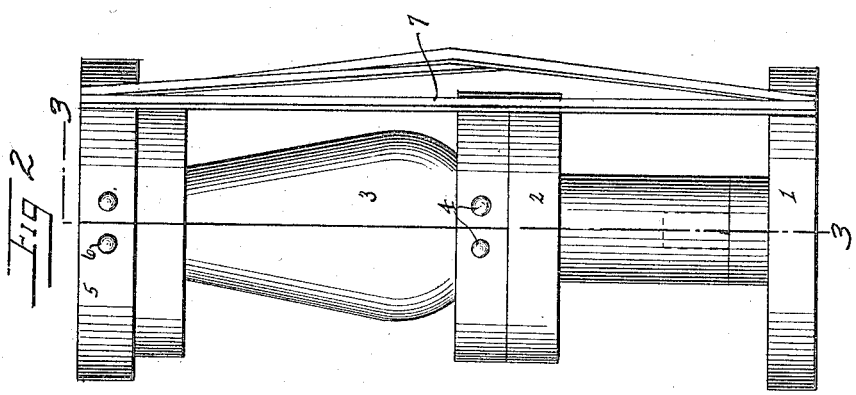
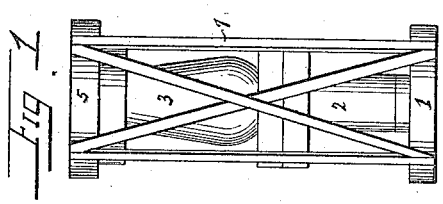
Inventor
Francis J. Moloney
By Geo. P. Kimmel.
Attorney

UNITED STATES PATENT OFFICE.

FRANCIS J. MOLONEY, OF CORNING, NEW YORK.

SCREW-THREADED BULB-MOLD.

1,222,784.　　　　　Specification of Letters Patent.　　Patented Apr. 17, 1917.

Application filed November 26, 1915. Serial No. 63,451.

*To all whom it may concern:*

Be it known that I, FRANCIS J. MOLONEY, a citizen of the United States, residing at Corning, in the county of Steuben and State of New York, have invented certain new and useful Improvements in Screw-Threaded Bulb-Molds, of which the following is a specification.

This invention relates to a screw threaded bulb mold.

The object of my invention is to provide a mold primarily for forming incandescent bulbs with a screw threaded end formed thereon. It is a well known fact that under the present method of molding incandescent bulbs they are not threaded, this being impossible heretofore because of the fact that the glass blower must constantly revolve the blowing tube within the mold in order to avoid the formation of a seam upon the face of the bulb. Consequently, a bulb with the screw thread could not be formed simply because it could not be revolved within the mold. My device overcomes this difficulty by providing a screw thread mold section adapted to remain stationary, said screw thread section registering with the bulb section adapted to revolve, thereby giving the necessary rotation to prevent the formation of a seam upon the bulb and at the same time forming a screw threaded end integral therewith. Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claim appended hereunto and forming a part of this application.

Referring now to the drawings which are merely illustrative of my invention:

Figure 1 is a rear elevational view of my mold.

Fig. 2 is a side elevational view thereof.

Fig. 3 is a vertical sectional view taken on the line 3—3 of Fig. 2.

Referring further to the drawings, wherein similar reference characters indicate similar parts throughout the respective views, 1 designates a base, having a turn table 2 mounted thereon. The top of said turn table forms a seat for a bulb mold portion 3, said bulb mold portion being formed in two vertical sections hingedly secured together, and formed with handles 4 for opening and closing said bulb mold portion. A screw threaded mold portion 5 formed of two equal sections hingedly mounted together and provided with handles 6 for opening said sections, is fixedly mounted upon the upper end of supports 7 which are secured at their lower ends to said base 1. Said screw threaded mold portion 5 is so positioned that when the bulb mold portion 3 is placed upon the turn table 2 the underface of said screw threaded portion will be in close proximity to the upper face of said bulb mold portion, and the opening in the top of the bulb mold portion will register with the opening in the screw threaded portion, thereby forming a continuous mold when the parts are placed together in operative position.

From the construction as described, it is obvious that when the blower inserts the glass within the mold for shaping, that he will not revolve his blow pipe but will instead revolve the turn table 2 and consequently the bulb mold portion 3 mounted thereon.

The utility, adaptability, and advantages of my improved form of screw threaded bulb mold being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof, not departing in principle from my invention, and falling within the purview of the appended claim.

What I claim as my invention and desire to secure by Letters Patent is:

A screw threaded bulb mold, consisting of a base, a turn table rotatably mounted thereon, the upper surface thereof being enlarged to provide a bearing surface, a bulb mold member having its base enlarged to conform with the upper enlarged surface of the turn table, a screw threaded mold mounted on said bulb member and rigidly connected to the base by means of support bars.

In testimony whereof I affix my signature hereto.

FRANCIS J. MOLONEY.

Copies of this patent may be obtained for five cents each, by addressing the "Commissioner of Patents, Washington, D. C."